(12) United States Patent
Zhang (10) Patent No.: US 10,649,734 B2
(45) Date of Patent: May 12, 2020

(54) RANDOM NUMBER GENERATION METHOD AND DEVICE UTILIZED IN COMPUTER SYSTEM

(71) Applicant: ALIBABA GROUP HOLDING LIMITED, Grand Cayman (KY)

(72) Inventor: He Zhang, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

(21) Appl. No.: 16/287,617

(22) Filed: Feb. 27, 2019

(65) Prior Publication Data

US 2019/0196791 A1 Jun. 27, 2019

Related U.S. Application Data

(63) Continuation of application No. PCT/CN2017/097779, filed on Aug. 17, 2017.

(30) Foreign Application Priority Data

Aug. 29, 2016 (CN) .......................... 2016 1 0751289

(51) Int. Cl.
*G06F 7/58* (2006.01)

(52) U.S. Cl.
CPC ................ *G06F 7/58* (2013.01); *G06F 7/582* (2013.01)

(58) Field of Classification Search
CPC ................................................ G06F 7/58–588
(Continued)

(56) References Cited

U.S. PATENT DOCUMENTS

| | | | |
|---|---|---|---|
| 4,687,988 A | 8/1987 | Eichelberger et al. | |
| 4,688,223 A | 8/1987 | Motika et al. | |

(Continued)

FOREIGN PATENT DOCUMENTS

| | | |
|---|---|---|
| CN | 101127575 A | 2/2008 |
| CN | 102520908 A | 6/2012 |

(Continued)

OTHER PUBLICATIONS

Decision for Grant for Japanese Application No. 2019-511915 dated Nov. 19, 2019 (1 page).

(Continued)

*Primary Examiner* — Matthew D Sandifer
(74) *Attorney, Agent, or Firm* — Sheppard Mullin Richter & Hampton LLP (57) ABSTRACT

Methods, systems, and apparatus, including computer programs encoded on computer storage media, for distributing a value among a plurality of accounts. One of the methods includes receiving, from a first terminal associated with a first account, a request for generating values, wherein the request comprises a sum of the values to be generated and a count of multiple second accounts, to which the values are to be distributed. The method also includes determining an average based on the sum and the count, generating multiple values in response to the request, the generated values comprising one or more value pairs and zero or one individual value, wherein a count of the generated values equals the count of second accounts in the request. The method further includes distributing the multiple values to the second accounts, wherein each of the second accounts is associated with a second terminal.

18 Claims, 5 Drawing Sheets

(58) Field of Classification Search
USPC .................................................. 708/250–256
See application file for complete search history.

(56) References Cited

U.S. PATENT DOCUMENTS

| | | | |
|---|---|---|---|
| 4,801,870 A | | 1/1989 | Eichelberger et al. |
| 6,061,819 A | * | 5/2000 | Bening ................. G06F 11/263 |
| | | | 714/741 |
| 6,728,740 B2 | | 4/2004 | Kelly et al. |
| 7,328,228 B2 | | 2/2008 | Klein et al. |
| 8,187,076 B2 | | 5/2012 | Okada |
| 8,298,070 B2 | | 10/2012 | Kato et al. |
| 8,370,411 B2 | * | 2/2013 | Mitra ......................... G06F 7/58 |
| | | | 708/250 |
| 9,641,598 B1 | * | 5/2017 | Yuhan ..................... G06Q 99/00 |
| 10,146,509 B1 | * | 12/2018 | Todaro ..................... G06F 7/588 |
| 2002/0159590 A1 | | 10/2002 | Ikeda |
| 2003/0050943 A1 | | 3/2003 | Ikeda et al. |
| 2005/0143168 A1 | | 6/2005 | Torango |
| 2005/0209004 A1 | | 9/2005 | Torango |
| 2006/0123073 A1 | | 6/2006 | Schmidt |
| 2008/0065710 A1 | | 3/2008 | Fiorentino et al. |
| 2010/0070549 A1 | * | 3/2010 | Nagaraj .................... G06F 7/58 |
| | | | 708/254 |
| 2010/0235418 A1 | | 9/2010 | Dong |
| 2017/0364894 A1 | | 12/2017 | Karantzis |
| 2018/0275963 A1 | * | 9/2018 | Kim ......................... G06F 7/582 |
| 2019/0196791 A1 | | 6/2019 | Zhang |

FOREIGN PATENT DOCUMENTS

| | | |
|---|---|---|
| CN | 102799413 A | 11/2012 |
| CN | 106919365 A | 7/2017 |
| EP | 0206287 A2 | 12/1986 |
| EP | 0218791 A1 | 4/1987 |
| EP | 1094603 A1 | 4/2001 |
| EP | 1241564 A2 | 9/2002 |
| JP | 2003084970 A | 3/2003 |
| JP | 1587687 B2 | 11/2010 |
| JP | 2012100872 A | 5/2012 |
| JP | 4991955 B1 | 8/2012 |
| JP | 2013106805 A | 6/2013 |
| JP | 5256478 B2 | 8/2013 |
| JP | 5384221 B2 | 1/2014 |
| KR | 1020010067247 A | 7/2001 |
| KR | 1020080111491 A | 12/2008 |
| TW | I435265 B | 4/2014 |
| WO | 2016/101027 A1 | 6/2016 |
| WO | 2016/118340 A1 | 7/2016 |

OTHER PUBLICATIONS

Written Opinion of the International Searching Authority and International Search Report for PCT Application No. PCT/CN2017/097779 dated Nov. 17, 2017 (14 pages).
International Preliminary Report on Patentability Chapter I for PCT Application No. PCT/CN2017/097779 dated Mar. 14, 2019 (11 pages).
Second Office Action for Chinese Application No. 201610751289.X dated Jan. 23, 2019 with English machine translation (10 pages).
Notice of Allowance for Korean Application No. 10-2019-7009107 dated Feb. 7, 2020.

* cited by examiner

RANDOM NUMBER GENERATION METHOD AND DEVICE UTILIZED IN COMPUTER SYSTEM

CROSS-REFERENCE TO RELATED APPLICATIONS

This application is a continuation application of International Application No. PCT/CN2017/097779, filed on Aug. 17, 2017, which is based on and claims priority to and benefits of Chinese Patent Application No. 201610751289.X filed with the State Intellectual Property Office (SIPO) of the People's Republic of China on Aug. 29, 2016. The entire contents of the above-identified applications are incorporated herein by reference.

TECHNICAL FIELD

This application relates to the field of computer technologies, and in particular, to a random number generation method and device implemented in a computer system.

BACKGROUND

In the conventional technology, when a specified number of random numbers are to be generated, usually the specified number of random numbers are generated randomly by invoking a random function. However, the random numbers cannot be effectively controlled (for example, keeping the random numbers within a range) because the random numbers are generated randomly. As a result, the specified number of random numbers generated are unevenly distributed. For example, in a scenario in which sending of "red packets" is implemented, a "red packet amount" randomly generated by a payment service end may be extremely large, or may be extremely small (for example, 0.01). This may bring about relatively poor experience for a user.

SUMMARY

This application describes a method for distributing a value among a plurality of accounts and device implemented in a computer system, capable of achieving effective control of generated values. Herein, values generated according embodiments disclosed herein may be referred to as random numbers.

A first aspect provides a random number generation method implemented in a computer system. The method includes:

receiving a first request, where the first request includes a sum and a count of a specific number of random numbers to be generated;

determining an average based on the sum and the count;

partitioning the specific number of random numbers to be generated into a plurality of subsets, where each of the subsets includes one or two random numbers, and when a subset includes two random numbers, a sum of the two random numbers is twice the average and a quotient of the two random numbers is a preset threshold; and determining the one or two random numbers in each of the plurality of subsets, to obtain the specific number of random numbers.

A second aspect provides a random number generation device implemented in a computer system. The device includes:

a receiving unit, configured to receive a first request, where the first request includes a sum and a count of a specific number of random numbers to be generated; a determining unit, configured to determine an average based on the sum and the count received by the receiving unit; and a partitioning unit, configured to partition the specific number of random numbers to be generated into a plurality of subsets, where each of the subsets includes one or two random numbers, and when a subset includes two random numbers, a sum of the two random numbers is twice the average and a quotient of the two random numbers is a preset threshold, where the determining unit is further configured to determine the one or two random numbers in each of the plurality of subsets, to obtain the specific number of random numbers.

According to a further aspect, an embodiment provides a computer-implemented method for distributing a value among a plurality of accounts, comprising: receiving, from a first terminal associated with a first account, a request for generating values, wherein the request comprises a sum of the values to be generated and a count of a plurality of second accounts, to which the values are to be distributed; determining an average based on the sum and the count; generating a plurality of values in response to the request, the generated values comprising one or more value pairs and zero or one individual value, wherein a count of the generated values equals the count of second accounts in the request, and wherein the generating comprises: determining two values for each of the one or more value pairs such that a sum of the two values equals the average multiplied by two, and determining any individual value based at least in part on the average; and distributing the plurality of values to the second accounts, wherein each of the second accounts is associated with a second terminal.

In some embodiments, the determining two values for each of the one or more value pairs comprises determining the two values based at least in part on a preset quotient between the two values.

In other embodiments, the determining two values for each of the one or more value pairs comprises: determining a deviation range for the two values of the value pair based at least in part on the count and a preset threshold; determining a deviation by randomly selecting a number within the deviation range; and determining the two values based at least in part on the deviation and the average.

In other embodiments, the determining an individual value comprises: randomly attenuating the average to obtain an attenuated value; and determining the individual value based on the attenuated value and a preset minimum.

In yet other embodiments, the method further comprises determining a residue number based on the sum and the generated values; determining a residue value by dividing the residue number by the count; and adding the residue value to each of the generated values to obtain a plurality of updated values.

In still other embodiments, the method further comprises sorting the generated values; and storing the sorted values to a list.

According to another further aspect, an embodiment provides a system for distributing a value among a plurality of accounts, comprising a processor and a non-transitory computer-readable storage medium storing instructions executable by the processor to cause the system to perform operations comprising: receiving, from a first terminal associated with a first account, a request for generating values, wherein the request comprises a sum of the values to be generated and a count of a plurality of second accounts, to which the values are to be distributed; determining an average based on the sum and the count; generating a plurality of values in response to the request, the generated values comprising one or more value pairs and zero or one individual value, wherein a count of the generated values equals the count of second accounts in the request, and wherein the generating comprises: determining two values for each of the one or more value pairs such that a sum of the two values equals the average multiplied by two, and determining any individual value based at least in part on the average; and distributing the plurality of values to the second accounts, wherein each of the second accounts is associated with a second terminal.

According to yet another further aspect, an embodiment provides a non-transitory computer-readable storage medium for distributing a value among a plurality of accounts, configured with instructions executable by one or more processors to cause the one or more processors to perform operations comprising: receiving, from a first terminal associated with a first account, a request for generating values, wherein the request comprises a sum of the values to be generated and a count of a plurality of second accounts, to which the values are to be distributed; determining an average based on the sum and the count; generating a plurality of values in response to the request, the generated values comprising one or more value pairs and zero or one individual value, wherein a count of the generated values equals the count of second accounts in the request, and wherein the generating comprises: determining two values for each of the one or more value pairs such that a sum of the two values equals the average multiplied by two, and determining any individual value based at least in part on the average; and distributing the plurality of values to the second accounts, wherein each of the second accounts is associated with a second terminal.

In the value generation method and device implemented in a computer system provided in this application, upon a first request is received, first, values to be generated are partitioned into a plurality of subsets, where when a subset includes two values, a sum of the two values is twice an average and a quotient of the two values is a preset threshold; and then one or two values included in each of the subsets are sequentially determined to obtain a specified number of values. In this way, the objective of controlling generated values is achieved.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following describes the embodiments of the present disclosure with reference to the accompanying drawings.

The random number generation method and device implemented in a computer system provided in this application are applicable to a scenario in which random numbers are generated when a sum and a count of a specific number of random numbers to be generated are fixed, and in particular, applicable to a scenario in which uniformly distributed random numbers are generated when a sum and a count of a specific number of random numbers to be generated are fixed.

Figure 1:
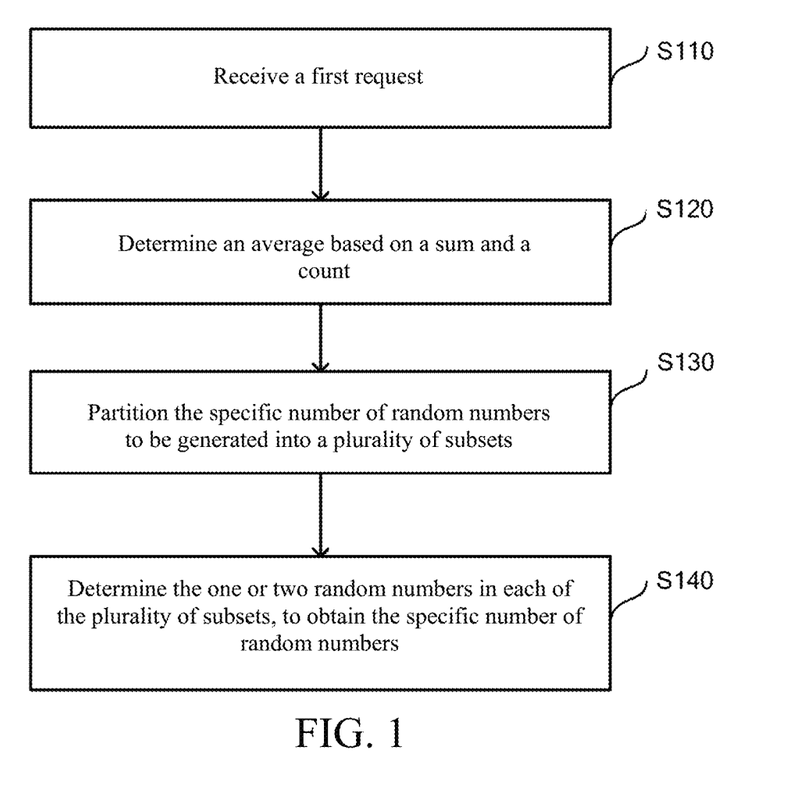
FIG. 1 is a flowchart of a random number generation method implemented in a computer system according to an embodiment of this application.

FIG. 1 is a flowchart of a random number generation method implemented in a computer system according to an embodiment of this application. The method may be performed by equipment having a processing capability: a server, a system or a device, for example, a service end of a payment system. As shown in FIG. 1, the method may specifically include the following steps.

Step 110: Receive a first request.

The first request may be any request used to instruct the server, the system or the device to distribute a value among a plurality of accounts or a request for generating a plurality of values or random numbers. The first request may include a sum of values or random numbers to be generated, a count of a specific number of values or random numbers to be generated, and the like. The first request may be sent and received from a first terminal associated with a first account of a user. It may be a request to distribute a total value (e.g., a value corresponding to the sum) to a plurality of second accounts corresponding to a plurality of second terminals, respectively. The count of values or random numbers to be generated may correspond to the number of second accounts that the values are to be distributed to.

Step 120: Determine an average based on the sum and the count.

Herein, the average may be a quotient obtained by dividing the sum by the count. A scenario in which "red packets" are sent is used as an example, assuming that a total amount of the red packets is 100 RMB and a count of the red packets is ten, an average distributed amount may be 100/10=10 RMB. That is, 10 RMB may be distributed to each person on average. Here, the "red packets" may refer to a service allowing a user to send money to one or more other users electronically. The cash sent to each user may be represented by a red packet, which the recipient may open to claim the money.

Step 130: Partition the specific number of random numbers/values to be generated into a plurality of subsets.

Each of the subsets includes one or two random numbers. When the subset includes two random numbers, a sum of the two random numbers is twice the average and a quotient of the two random numbers is a preset threshold. Such a subset that includes two random numbers/values may be referred to as a value pair. A subset that includes one random number/value may be referred to as an individual value.

Herein, a count of the subsets may be determined based on the count of the random numbers to be generated. For example, the count of the subsets may be calculated based on the following formula: INT(count/2) or INT(count/2)+1. INT( ) is a rounding function, that is, INT( ) is used to obtain an integer part of a number. Specifically, when the count of the random numbers to be generated is an even number, the count of the subsets may be determined based on the formula: INT(count/2); and when the count of the random numbers to be generated is an odd number, the count of the subsets may be determined based on the formula: INT (count/2)+1. It will be appreciated that when the count of the random numbers to be generated is an even number, each of the subsets may include two random numbers; and when the count of the random numbers to be generated is an odd number, at least one of the subsets includes only one random number.

For example, assuming that the count of the random numbers to be generated is ten, that is, the count of the random numbers to be generated is an even number, it can be determined that the count of the subsets is: INT(10/2)=5. For the five subsets obtained through partitioning, when each of the subsets includes two random numbers, it may be defined that a sum of the two random numbers is twice an average and a quotient of the two random numbers is a preset threshold. After the foregoing definition is made for the two random numbers, the two random numbers may compose the following linear equations with two unknowns:

$$\begin{cases} S_1 + S_2 = 2AVG \\ S_1/S_2 = GAP \end{cases} \quad \text{(Formula 1)}$$

$S_1$ and $S_2$ respectively represent the two random numbers in the subset, AVG is the average, and GAP refers to the preset threshold, which may be determined according to actual needs.

For another example, assuming that the count of the random numbers to be generated is nine, that is, the count of the random numbers to be generated is an odd number, it can be determined that the count of the subsets is: INT(9/2)+1=5. For the five subsets obtained through partitioning, when one subset includes one random number and the other subsets include two random numbers, it may also be defined that a sum of the two random numbers is twice an average and a quotient of the two random numbers is a preset threshold. After the foregoing definition is made for the two random numbers, the two random numbers may alternatively compose the linear equations with two unknowns shown in Formula 1.

In some embodiments, by correspondingly defining a sum and a quotient of two random numbers in a subset, an objective of controlling a difference between two random numbers in a same subset can be achieved, and the random numbers are relatively similar in value in a middle region, that is, the random numbers are within a range partitioned using the average as a center, by which it can be ensured that the generated random numbers are distributed relatively evenly.

Step 140: Determine the one or two random numbers/values in each of the plurality of subsets, to obtain the specific number of random numbers/values. The determined random numbers/values may then be sent to one or more accounts associated with one or more terminals of users. The random numbers/values may be stored in association with the accounts server-side or be sent to the terminals.

When the count of the random numbers to be generated is an even number, the two random numbers in each subset may be determined based on Formula 1. After the two random numbers in each subset are determined, the specific number of random numbers can be obtained. In the foregoing example, after each random number in the five subsets is determined, ten random numbers can be obtained. In some embodiments, when a subset includes one random number, the random number may be determined based on the average. For example, the average may be randomly attenuated to obtain an attenuated value, which is to be used as the one random number. Alternatively, the random number may be determined in another manner such as directly using the average as the one random number. This is not limited in this application.

In other embodiments, for the case in which a subset includes two random numbers, the foregoing merely provides one method for determining the two random numbers in the subset. In another implementation of this application, the two random numbers in the subset may alternatively be determined through the steps shown in FIG. 2.

Figure 2:
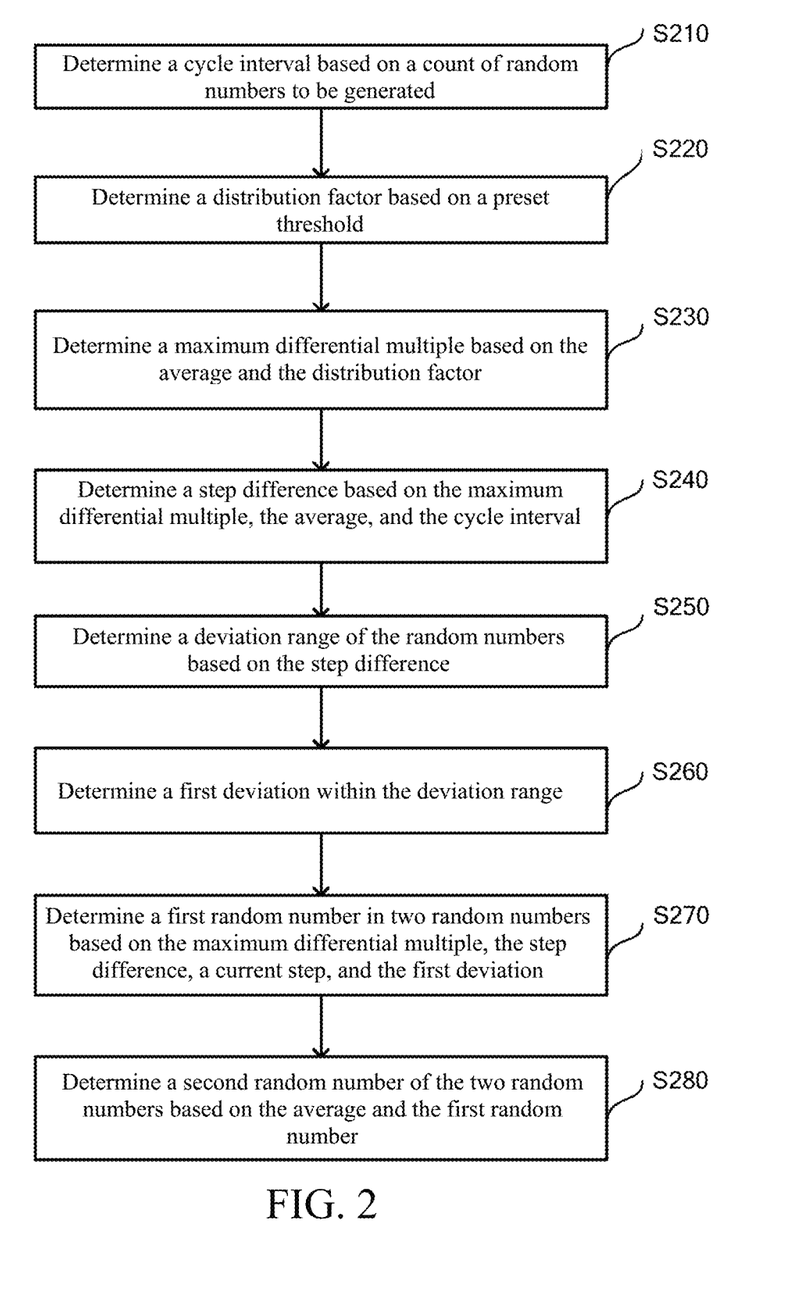
FIG. 2 is a schematic flowchart of a method for determining random numbers in a subset according to this application.

Step 210: Determine a cycle interval based on a count of random numbers/values to be generated.

In an implementation, the cycle interval may be determined based on Formula 2.

Interval=count/2 (Formula 2)

Interval is the cycle interval and count is the count of the random numbers to be generated.

Step 220: Determine a distribution factor based on a preset threshold.

In an implementation, the distribution factor may be determined based on Formula 3.

primer=(2*GAP)/(1+GAP) (Formula 3)

Primer is the distribution factor and GAP is the preset threshold.

Step 230: Determine a maximum differential multiple based on the average and the distribution factor.

In an implementation, the maximum differential multiple may be determined based on Formula 4.

top=Math.min((AVG*primer),(2*AVG−1)) (Formula 4)

In this equation, top is the maximum differential multiple, AVG is the average, primer is the distribution factor, and Math.min( ) is a function for taking a minimum value. For example, the two values, (AVG*primer) and (2*AVG−1), are compared and then a minimum value is taken as the maximum differential multiple.

Step 240: Determine a step difference based on the maximum differential multiple, the average, and the cycle interval.

In an implementation, the step difference may be determined based on Formula 5.

stepM=(top−AVG)/Interval (Formula 5)

StepM is the step difference, top is the maximum differential multiple, AVG is the average, and Interval is the cycle interval.

Step 250: Determine a deviation range of the random numbers/values based on the step difference.

In an implementation, the deviation range of the random numbers may be determined based on Formula 6.

$Ri$=(int)(1$d$/(5+random.nextInt(25))*stepM) (Formula 6)

Ri is the deviation range, stepM is the step difference, and random.nextInt(25) is a random function for randomly selecting any integer from a range of 0 to 25. Based on Formula 6, it can be determined that Ri is [0,1/30*stepM], that is, the deviation range is [0,1/30*stepM].

Step 260: Determine a first deviation within the deviation range.

The first deviation herein may refer to any value randomly selected from the deviation range [0,1/30*stepM].

Step 270: Determine a first random number/value in two random numbers/values based on the maximum differential multiple, the step difference, a current step size, and the first deviation.

In an implementation, the first random number of the two random numbers may be determined based on Formula 7.

$$S_1 = \text{top} - (\text{int})((\text{stepGo}++)*\text{stepM}) - ri \quad \text{(Formula 7)}$$

$S_1$ is the first random number of the two random numbers, and the first random number may refer to a larger one of the two random numbers; top is the maximum differential multiple; stepGo is the current step size, when the first random number in the first subset is determined, stepGo may be 0, and subsequently when the first random number in the second subset is determined, stepGo may be 1, that is, stepGo increases by 1 each time, and so on; stepM is the step difference; and ri is the first deviation.

Step 280: Determine a second random number/value of the two random numbers/values based on the average and the first random number.

In an implementation, the second random number of the two random numbers may be determined based on Formula 8.

$$S_2 = (\text{int})(2*\text{AVG}) - S_1 \quad \text{(Formula 8)}$$

$S_2$ is the second random number of the two random numbers, and the second random number may refer to a smaller one of the two random numbers; AVG is the average; and $S_1$ is the first random number of the two random numbers.

The foregoing describes a method for determining two random numbers in a subset in another implementation. When the subset includes only one random number, the one random number may be determined through the following steps:

randomly attenuating the average; and determining one random number in a second subset based on the result from the random attenuation of the average and a preset minimum random number. The second subset herein may refer to any subset including only one random number.

In an implementation, the one random number in the second subset may be determined based on Formula 9.

$$S_1 = (\text{int})\text{Math.max}(\text{MIN},(\text{AVG}-1-\text{random.nextInt}(\text{FLUCTUATION}))) \quad \text{(Formula 9)}$$

$S_1$ is the one random number; MIN is the preset minimum random number, for example, MIN may be 0.01; AVG is the average; FLUCTUATION may be a preset constant, and the constant may be a value by which attenuation is to be performed on the average; and Math.max( ) is a function for taking a maximum value. For example, the two values, MIN and (AVG−1−random.nextInt(FLUCTUATION)), are compared and then a maximum number is taken as the one random number in the second subset.

Back to step 140, it will be appreciated that the specific number of random numbers can be obtained after determining the one or two random numbers in each subset according to the method for determining one or two random numbers in a subset (for example, the steps in FIG. 2).

Optionally, after step 140 is performed, the following steps may further be performed:

Step A: Determine a residue number based on the sum and the specific number of random numbers/values.

In some embodiments, a sum of the specific number of random numbers obtained through a conventional method or the steps in FIG. 2 usually is not equal to the sum. For example, in the scenario in which "red packets" are sent, a sum of red packet amounts of the specific number of red packets, that is, a sum of amounts of the "red packets" that are sent, usually is not equal to a total amount of the red packets. As a result, a problem of fund loss is caused. To resolve the problem, in this application, the residue number may be determined based on the sum and the specific number of random numbers. For example, the residue number may be determined by calculating a difference between the sum and a sum of the specific number of random numbers. For example, in the foregoing example, when the total amount of the red packets is 100 RMB, assuming that the sum of ten red packet amounts is 90 RMB, the residue amount is 10 RMB.

Certainly, in an actual application, the residue number may alternatively be determined when the steps in FIG. 2 are performed, so that the efficiency of determining the residue number can be improved. In an example, the residue number may be initialized to be a sum, and subsequently each time after determining one or two random numbers in a subset, the residue number is updated to a difference between the residue number and one random number, or the residue number is updated to a difference between the residue number and a sum of two random numbers. It will be appreciated that after random numbers in all subsets are determined, an updated residue number is a final residue number.

Step B: Split the residue number.

In an implementation, the residue number may be split into the specific number of sub-numbers or residue values. For example, in the foregoing example, when the residue amount is 10 RMB and the count of the red packets is ten, the sub-numbers obtained after splitting may be ten 1 RMB's. Certainly, in an actual application, the residue number may alternatively be split into another specific number of sub-numbers and the sub-numbers may be different. This is not limited in this application.

Step C: Superpose the result from the splitting the residue number to the specific number of random numbers/values (or adding the residue value to each of the random numbers/values) to obtain the specific number of updated random numbers/values.

For example, assuming that the sum is ten, the count of the random numbers to be generated is ten, and the ten obtained random numbers respectively are: 1.2, 0.7, 1.1, 0.8, 1.3, 0.6, 1.5, 0.4, 1.0, and 0.9, the residue number may be 0.5. The residue number 0.5 is split into ten 0.05's, and the ten updated random numbers may be: 1.25, 0.75, 1.15, 0.85, 1.35, 0.65, 1.55, 0.45, 1.05, and 0.95.

In the scenario in which "red packets" are sent, fund loss can be avoided by superposing the residue amounts resulting from the splitting to the red packet amounts of the specific number of the red packets.

Optionally, after step 140 is performed, or after step C is performed, the following steps may further be performed:

Step X: Re-sort the specific number of random numbers/values.

Herein, the specific number of random numbers may be re-sorted in any order, so that the random numbers are prevented from being stored in the order of their sizes, and in addition, it can be ensured that when sums and counts of random numbers to be generated are respectively the same, orders of the specific numbers of random numbers partitioned in two or more successively instances are not repetitive.

Step Y: Store the specific number of re-sorted random numbers/values to a list.

Certainly, in an actual application, the specific number of re-sorted random numbers may alternatively be stored in a storage unit of another form. This is not limited in this application.

The specific number of random numbers in step X and step Y may alternatively refer to the specific number of random numbers to which the results from the splitting the residue number are superposed.

Figure 3:
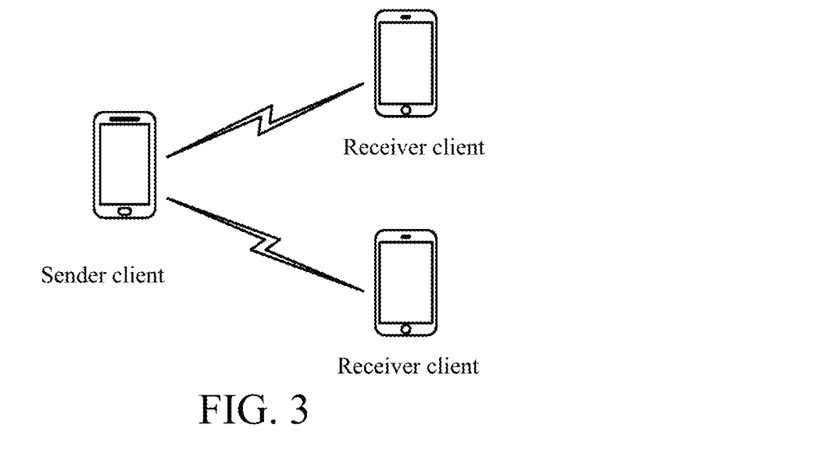
FIG. 3 is a schematic diagram of an application scenario of a random number generation method implemented in a computer system according to this application.

In some embodiments, the random number generation method implemented in a computer system provided in this application may be implemented in a scenario of sending "red packets" shown in FIG. 3. In FIG. 3, one sender client and a plurality of receiver clients are included. The sender client is configured to send a "red packet" receiving notification. The receiver clients are configured to perform a corresponding "red packet" receiving operation according to the "red packet" receiving notification sent by the sender client. There are a plurality of manners for the sender client to send a "red packet" receiving notification. For example, the sender client is an Alipay client. There may be two manners for the Alipay client to send a "red packet" receiving notification: In a first manner, the Alipay client may send a "red packet" receiving notification in a group, where the group may be set up through the following steps: Contacts-→Group→Select a group type (for example, an entertainment group)→Select a user. In a second manner, a sender user may turn to a red packet generation interface by triggering a "red packet" text or a corresponding "red packet" pattern in an "Alipay" application interface; in the red packet generation interface, the sender user enters a password, enters "total amount" and "red packet count" in a selected group type, and then taps "send red packet", so that sending of a "red packet" receiving notification can be implemented. It will be appreciated that the "red packet" receiving notification sent by using the foregoing two manners may include information such as "total amount" and "red packet count".

In FIG. 3, after the sender client sends the "red packet" receiving notification, a service end may receive a first request, where the first request may include a total amount of the red packets and a count of red packets to be sent, and then the service end may partition red packet amounts of the count of the red packets from a total amount of the red packets. When the service end receives a "red packet" receiving request sent by a receiver client, that is, when a receiver user receives a red packet, one of the red packet amounts is distributed to the receiver client. In this example, the total amount may correspond to the aforementioned total value to be distributed to a plurality of accounts. Here, the request specifying this total value is sent from a first terminal (e.g., sender client) associated with a first account. The count of values (e.g., red packet amounts) to be generated may correspond to the number of receiver clients (i.e., second terminals associated with second accounts) that the receiving notification is sent to.

However, in the process in which the service end partitions red packet amounts of the count of the red packets, the service end usually generates each red packet amount randomly. As a result, the red packet amount that is randomly generated by the service end may be extremely large, or may be extremely small (for example, 0.01).

Figure 4:
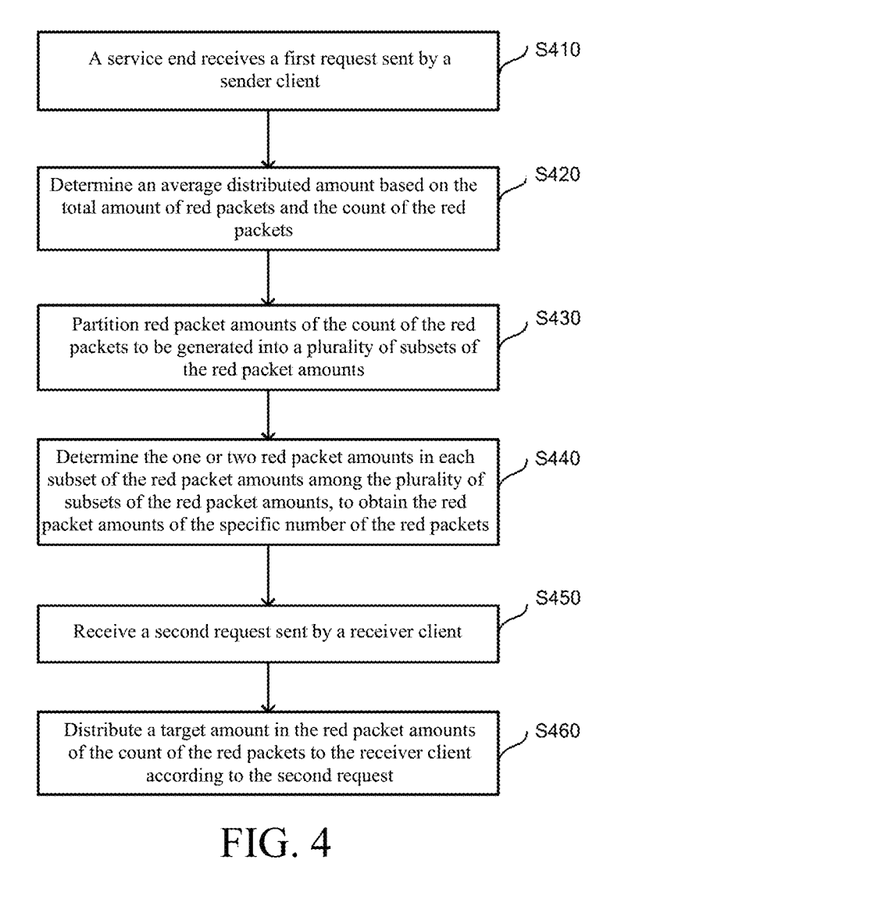
FIG. 4 is a flowchart of a method for generating red packet amounts in the scenario shown in FIG. 3.

When the random number generation method implemented in a computer system of this application is implemented in the scenario shown in FIG. 3, the red packet amount can be controlled. Specifically, when the random number generation method implemented in a computer system of this application is implemented in the scenario shown in FIG. 3, a sum of random numbers to be generated is equivalent to the total amount of the red packets, a count of the random numbers to be generated is equivalent to a count of red packets to be sent, the random numbers are equivalent to the red packet amounts, and the random number generation method may be a red packet amount generation method. FIG. 4 provides a red packet amount generation method. In FIG. 4, the method may specifically include the following steps.

Step 410: A service end receives a first request sent by a sender client.

The first request may include a total amount of red packets and a count of a specific number of red packets to be sent.

Step 420: Determine an average distributed amount based on the total amount of red packets and the count of the red packets.

Herein, the average distributed amount may be a quotient obtained by dividing the total amount of the red packets by the count of the red packets. For example, assuming that the total amount of the red packets is 100 RMB and the count of the red packets is ten, an average distributed amount may be 100/10=10 RMB. That is, 10 RMB may be distributed to each person on average.

Step 430: Partition red packet amounts of the count of the red packets to be generated into a plurality of subsets of the red packet amounts.

Each subset of the red packet amounts includes one or two red packet amounts. When a subset of the red packet amounts includes two red packet amounts, a sum of the two red packet amounts is twice an average distributed amount and a quotient of the two red packet amounts is a preset threshold.

Herein, a count of the subsets of the red packet amounts may be determined based on the count of the red packets to be sent. For example, the count of the subsets of the red packet amounts may be calculated based on the following formula: INT(count of red packets/2) or INT(count of red packets/2)+1. The INT( ) is a rounding function. That is, the INT( ) is used to obtain an integer part of a number. Specifically, when the count of the red packets is an even number, the count of the subsets of the red packet amounts may be determined based on the formula: INT(count of red packets/2), and when the count of the red packets is an odd number, the count of the subsets of the red packet amounts may be determined based on the formula: INT(count/2)+1. It will be appreciated that when the count of the red packets is an even number, each subset of red packet amounts may include two red packet amounts; and when the count of the red packets is an odd number, at least one of the subsets of red packet amounts includes only one red packet amount.

Assuming that the count of the red packets to be sent is ten, that is, the count of the red packets is an even number, it can be determined that the count of the subsets of the red packet amounts is: INT(10/2)=5. For the five subsets of the red packet amounts obtained through the partitioning, when each subset of red packet amounts includes two red packet amounts, it may be defined that a sum of the two red packet amounts is twice the average distributed amount and a quotient of the two red packet amount is a preset threshold. After the foregoing definition is made to the two red packet amounts, the two red packet amounts may compose linear equations with two unknowns as shown in Formula 1.

Assuming that the count of the red packets to be sent is nine, that is, the count of the red packets is an odd number, it can be determined that the count of the subsets of the red packet amounts is: INT(9/2)+1=5. For the five subsets of the red packet amounts obtained through partitioning, when each subset of the red packet amounts includes one red packet amount and the other subsets of the red packet amounts each include two red packet amounts, it may alternatively be defined that a sum of the two red packet amounts is twice an average distributed amount and a quotient of the two red packet amount is a preset threshold. After the foregoing definition is made to the two red packet amounts, the two red packet amounts may alternatively compose linear equations with two unknowns as shown in Formula 1.

In this application, by correspondingly defining a sum and a quotient of two red packet amounts in a subset of red packet amounts, an objective of controlling a difference between two red packet amounts in a same subset of red packet amounts can be achieved, and the red packet amounts are relatively similar in value in a middle region, that is, the red packet amounts are within ranges partitioned using the average distributed amount as a center, by which it can be ensured that the red packet amounts distributed to receiver clients are relatively even, that is, it can be ensured that the "red packet" amounts distributed to receiver users are relatively even. In this way, the user experience can be improved.

Step 440: Determine the one or two red packet amounts in each subset of the red packet amounts among the plurality of subsets of the red packet amounts, to obtain the red packet amounts of the specific number of the red packets.

When the count of the red packets is an even number, two red packet amounts in each subset of red packet amounts can be determined based on Formula 1. After the two red packet amounts in each subset of red packet amounts are determined, the red packet amounts of the specific number of the red packets can be obtained. As described in the foregoing example, after each red packet amount in the five subsets of red packet amounts is determined, ten red packet amounts can be obtained. In some embodiments, when a subset of the red packet amounts includes one red packet amount, the red packet amount may be determined based on an average distributed amount, for example, the average distributed amount may be randomly attenuated to be used as the red packet amount. Herein, when the count of the red packets is an odd number, by giving a last red packet amount after the average distributed amount is randomly attenuated, a problem that the last red packet amount is fixed can be avoided. Therefore, violators are prevented from performing an illegal action by using this regularity.

In other embodiments, in the case in which the subset of the red packet amounts includes two red packet amounts, the foregoing only provides one method for determining the two red packet amounts, and in other implementations of this application, the two red packet amounts in the subset of the red packet amounts may alternatively be determined through the steps shown in FIG. 2. That is, the method is applicable by merely replacing the average in the steps shown in FIG. 2 with the average distributed amount and replacing the random number with the red packet amount.

The red packet amounts of the count of the red packets can be obtained after the one or two red packet amounts in each subset of red packet amounts are determined according to the method for determining one or two red packet amounts in a subset of red packet amounts (for example, the steps in FIG. 2).

Optionally, after step 440 is performed, the following steps may further be performed:

Step a: Determine a residue amount based on the total amount of the red packets and the red packet amounts of the specific number of the red packets.

A sum of red packet amounts of the specific number of the red packets, that is, a sum of amounts of the "red packets" that are sent, usually is not equal to a total amount of the red packets. As a result, a problem of fund loss is caused. To resolve the problem, in this application, the residue amount may be determined based on the total amount of the red packets and the red packet amounts of the specific number of the red packets. For example, the residue amount may be determined by calculating a difference between the total amount of the red packets and the red packet amounts of the specific number of the red packets. For example, in the foregoing example, when the total amount of the red packets is 100 RMB, assuming that the sum of ten red packet amounts is 90 RMB, the residue amount is 10 RMB.

Certainly, in an actual application, the residue amount may alternatively be determined when the steps in FIG. 2 are performed, so that the efficiency of determining the residue amount can be improved. In an example, the residue amount may be initialized to be a total amount of the red packets, and subsequently each time after one or two red packet amounts in a subset of the red packet amounts are determined, the residue amount is updated to a difference between the residue amount and a red packet amount, or the residue amount is updated to a difference between the residue amount and a sum of two red packet amounts. It will be appreciated that after red packet amounts in all subsets of red packet amounts are determined, an updated residue amount is a final residue amount.

Step b: Split the residue amount.

In an implementation, the residue amount may be split into a number of sub-numbers/residue values equal to the count of the red packets. For example, in the foregoing example, when the residue amount is 10 RMB and the count of the red packets is ten, the sub-numbers obtained after the splitting may be ten 1 RMB's. Certainly, in an actual application, the residue amount may alternatively be split into another specific number of sub-numbers and the sub-numbers may be different. This is not limited in this application.

Step c: Superpose the split residue amounts/residue values to the specific number of red packet amounts to obtain the specific number of updated red packet amounts.

For example, assuming that the total amount of the red packets is ten, the count of the red packets is ten, and the ten obtained red packet amounts respectively are: 1.2, 0.7, 1.1, 0.8, 1.3, 0.6, 1.5, 0.4, 1.0, and 0.9, the residue amount may be 0.5. The residue amount 0.5 is split into ten 0.05's, and the ten updated red packet amounts may be: 1.25, 0.75, 1.15, 0.85, 1.35, 0.65, 1.55, 0.45, 1.05, and 0.95.

Fund loss can be avoided by superposing the split residue amounts to the red packet amounts of the specific number of the red packets.

Optionally, after step 440 is performed, or after step c is performed, the following steps may further be performed:

Step x: Re-sort the red packet amounts of the specific number of the red packets.

Herein, the red packet amounts of the specific number of the red packets may be re-sorted in any order, so that the red packet amounts are prevented from being stored in the order of their sizes, and in addition, it can be ensured that when total amounts of the red packets and the counts of the red packet amounts are respectively the same, orders of the red packet amounts of the count of the red packets partitioned in two or more successively instances are not consistent.

Step y: Store the re-sorted red packet amounts of the count of the red packets to a list.

Certainly, in an actual application, the re-sorted red packet amounts of the count of the red packets may alternatively be stored in a storage unit of another form. This is not limited in this application.

In some embodiments, the red packet amounts of the count of the red packets in step x and step y may alternatively refer to the specific number of updated red packet amounts.

Step 450: Receive a second request sent by a receiver client.

The second request may include an identification of a receiver user (for example, information about an account of the receiver user or the like).

Step 460: Distribute a target amount in the red packet amounts of the count of the red packets to the receiver client according to the second request.

The target amount herein may refer to any red packet amount in the red packet amounts of the count of the red packets, or may alternatively refer to any red packet amount in the updated red packet amounts of the count of the red packets.

For example, after receiving the second request, the service end may read the target amount from the list and then distribute the target amount to the receiver client.

To describe the application of the random number/value generation method implemented in a computer system provided in this application in the scenario in which "red packets" are sent shown in FIG. 3, this application provides the following specific implementations.

Figure 5:
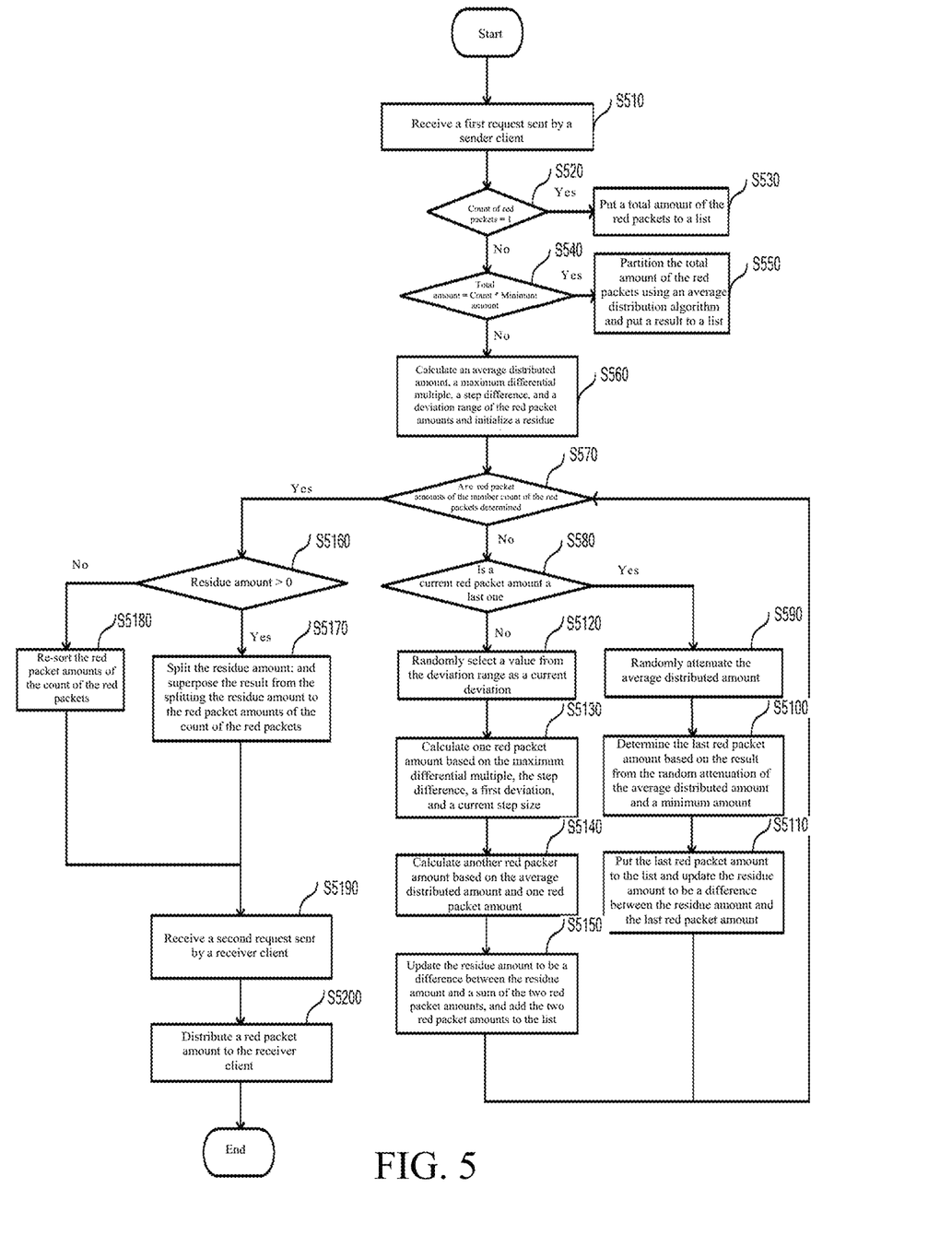
FIG. 5 is a flowchart of another method for generating red packet amounts in the scenario shown in FIG. 3.

FIG. 5 is a flowchart of another method for generating red packet amounts in the scenario shown in FIG. 3. As shown in FIG. 5, the method may specifically include the following steps.

Step 510: Receive a first request sent by a sender client.

Optionally, before receiving the first request, a minimum distributed amount (for example, 0.01 RMB) may be set in advance.

The first request may include a total amount of red packets and a count (count) of the red packets.

Step 520: Determine whether a count of red packets is 1, if yes, perform step 530, and if not, perform step 540.

Step 530: Put a total amount of the red packets to a list.

Step 540: Determine whether the total amount of the red packets is equal to the count of the red packets*a preset minimum distributed amount, if yes, perform step 550, and if not, perform step 560.

Step 550: Partition the total amount of the red packets into a number of minimum distributed amounts that is equal to the count of the red packets by using an average distribution algorithm, and put the minimum distributed amounts to the list.

Step 560: Calculate an average distributed amount, a maximum differential multiple, a step difference, and a deviation range of the red packet amounts and initialize a residue amount to be a total amount of the red packets.

Herein, for the method for calculating the average distributed amount, refer to step 120 or 420, and for the maximum differential multiple, the step difference, and the deviation range of the red packet amounts, refer to step 210 to step 250 and details are not described again.

Step 570: Determine whether red packet amounts of the count of the red packets have been determined, if not, perform step 580, and if yes, perform step 5160.

Step 580: Determine whether a red packet amount determined currently is a last red packet amount, if yes, perform step 590, and if not, perform step 5120.

Step 590: Randomly attenuate the average distributed amount to obtain an attenuated value.

Step 5100: Determine the last red packet amount based on the result from the random attenuation of the average distributed amount and the preset minimum distributed amount.

Step 5110: Put the last red packet amount to the list and update the residue amount to be a difference between the residue amount and the last red packet amount.

Step 5120: Randomly select a value from the deviation range calculated in step 560 as a current deviation.

Step 5130: Calculate one red packet amount based on the maximum differential multiple and the step difference calculated in step 560, a first deviation, and a current step size.

Herein, for the method for calculating one red packet amount, refer to step 370.

Step 5140: Calculate another red packet amount based on the average distributed amount and the one red packet amount.

Herein, for the method for calculating the another red packet amount, refer to step 380.

Step 5150: Update the residue amount to be a difference between the residue amount and a sum of the two red packet amounts, and add the one red packet amount and the other red packet amount to the list.

Step 5160: Determine whether the residue amount is greater than 0, if yes, perform step 5170, and if not, perform step 5180.

Step 5170: Split the residue amount; and superpose the residue amounts resulting from the splitting to the red packet amounts of the count of the red packets to obtain updated red packet amounts of the count of the red packets.

Herein, for the method for splitting the residue amount and the method for superposing the split residue amounts, refer to step B and step C or step b and step c.

Step 5180: Re-sort the red packet amounts of the count of the red packets or the updated red packet amounts of the count of the red packets.

Step 5190: Receive a second request sent by a receiver client.

Step 5200: Distribute a target amount in the red packet amounts of the count of the red packets or the updated red packet amounts of the count of the red packets to the receiver client.

The foregoing embodiments of this application have the following technical effects:

1) By defining the sum and the quotient of two red packet amounts in a subset of red packet amounts, control of partitioned red packet amounts can be implemented.

2) By splitting the residue amount and superposing the split residue amounts to the red packet amounts of the count of the red packets, it can be ensured that fund loss does not appear; and in addition, more uniform distribution can also be ensured.

3) By re-sorting the red packet amounts of the count of the red packets, the red packet amounts of the count of the red packets can be prevented from being stored in an order of their sizes.

4) When the count of the red packets is an odd number, by giving a last red packet amount after the average distributed amount is randomly attenuated, a problem that the last red packet amount is fixed can be avoided; and therefore, violators are prevented from performing an illegal action by using this regularity.

Certainly, the random number/value generation method implemented in a computer system provided in this application is not limited to the scenario in which "red packets"

are sent, but may be implemented in other scenarios, for example, amount distribution in business activities, and this is not limited in this application.

Figure 6:
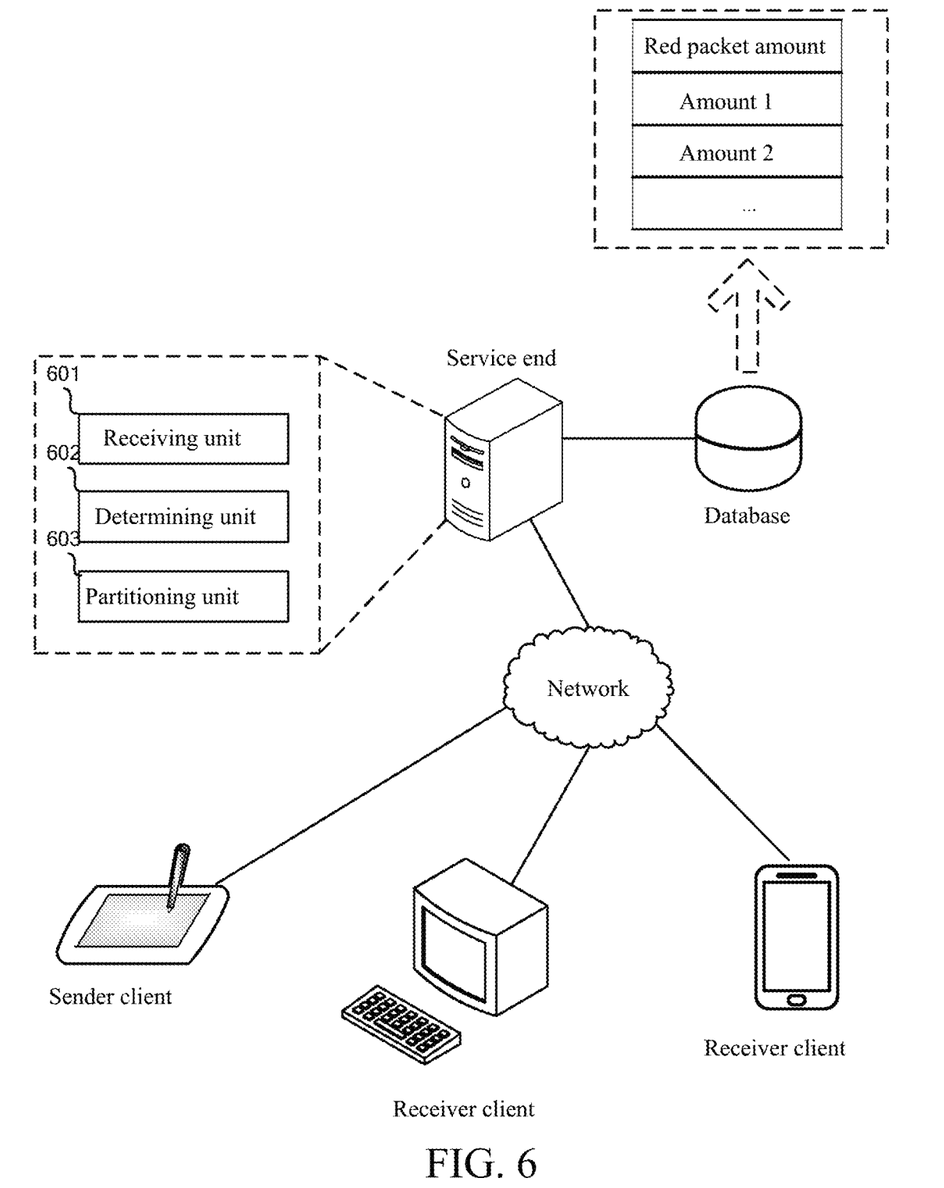
FIG. 6 is a schematic diagram of a random number generation device implemented in a computer system according to an embodiment of this application.

Corresponding to the random number/value generation method implemented in a computer system, an embodiment of this application further provides a random number/value generation device implemented in a computer system. For example, as shown in FIG. 6, the device includes:

a receiving unit 601, configured to receive a first request, where the first request includes a sum and a count of random numbers/values to be generated;

a determining unit 602, configured to determine an average based on the sum and the count received by the receiving unit 601; and a partitioning unit 603, configured to partition the specific number of random numbers/values to be generated into a plurality of subsets, where each of the subsets includes one or two random numbers/values, and when a subset includes two random numbers/values, a sum of the two random numbers/values is twice the average and a quotient of the two random numbers/values is a preset threshold.

The determining unit 602 is further configured to determine the one or two random numbers/values in each of the plurality of subsets, to obtain the specific number of random numbers/values.

Optionally, the determining unit 602 is further configured to: determine a cycle interval based on the count;

determine a distribution factor based on the preset threshold;

determine a maximum differential multiple based on the average and the distribution factor;

determine a step difference based on the maximum differential multiple, the average, and the cycle interval; and determine a deviation range of the random numbers/values based on the step difference.

The determining unit 602 is specifically configured to:
determine a first deviation within the deviation range;
determine a first random number of the two random numbers/values based on the maximum differential multiple, the step difference, a current step size, and the first deviation; and determine a second random number of the two random numbers/values based on the average and the first random number.

Optionally, the determining unit 602 is further configured to randomly attenuate the average; and determine the one random number in a second subset based on the result from the random attenuation of the average and a preset minimum random number.

Optionally, the device further includes a splitting unit 603 and a superposing unit 604.

The determining unit 602 is further configured to determine a residue number based on the sum and the specific number of random numbers/values.

The splitting unit 603 is configured to split the residue number determined by the determining unit 602.

The superposing unit 604 is configured to superpose the result from the splitting the residue number by the splitting unit 603 to the specific number of random numbers/values to obtain the specific number of updated random numbers/values.

Optionally, the device further includes:
a sorting unit 605, configured to re-sort the specific number of random numbers/values; and a storage unit 606, configured to store the specific number of random numbers/values re-sorted by the sorting unit 605 to a list.

The functions of the functional modules of the device in this embodiment of this application may be implemented through the steps in the foregoing method embodiments, and the specific working process of the device provided in this application is therefore not described herein.

In the random number generation device implemented in a computer system provided in this embodiment of this application, the receiving unit 601 receives a first request, where the first request includes a sum and a count of random numbers/values to be generated; the determining unit 602 determines an average based on the sum and the count; the partitioning unit 603 partitions the specific number of random numbers/values to be generated into a plurality of subsets; and the determining unit 602 determines one or two random numbers/values in each of the plurality of subsets, to obtain the specific number of random numbers/values. In this way, the objective of controlling generated random numbers/values is achieved.

Those skilled in the art should be aware of that in the one or more embodiments, the functions described in the present disclosure may be implemented by hardware, software, firmware, or a combination or the above. When implemented by using software, the functions can be stored in a computer readable medium or can be used as one or more instructions or code in a computer readable medium for transferring.

The foregoing specific implementations further describe the objectives, technical solutions, and beneficial effects of the present disclosure. It will be appreciated that the foregoing descriptions are merely specific implementations of the present disclosure, but are not intended to limit the protection scope of the present disclosure. Any modification, equivalent replacement, or improvement made based on the technical solutions of the present disclosure should fall within the protection scope of the present disclosure.

What is claimed is:

1. A computer-implemented method for distributing a plurality of random numbers among a plurality of accounts, comprising:
   receiving, at a service end system comprising a processor, a request for generating random numbers from a first terminal associated with a first account, wherein the request comprises a sum of the random numbers to be generated and a count of a plurality of second accounts, to which the random numbers are to be distributed;
   determining an average based on the sum and the count;
   generating, by the service end system, a plurality of random numbers in response to the request, the generated random numbers comprising one or more random number pairs and zero or one individual random number, wherein a count of the generated random numbers equals the count of second accounts in the request, and wherein the generating comprises:
   determining two random numbers for each of the one or more random number pairs such that a sum of the two random numbers equals the average multiplied by two, and
   determining any individual random number based at least in part on the average; and
   distributing, by the service end system, the plurality of random numbers to the second accounts, wherein each of the second accounts is associated with a second terminal, and
   wherein the service end system, first terminal, and second terminals are coupled via a network.

2. The method of claim 1, wherein the determining two random numbers for each of the one or more random number pairs comprises determining the two random numbers based at least in part on a preset quotient between the two random numbers.

3. The method of claim 1, wherein the determining two random numbers for each of the one or more random number pairs comprises:
   determining a deviation range for the two random numbers of the random number pair based at least in part on the count and a preset threshold;
   determining a deviation by randomly selecting a number within the deviation range; and
   determining the two random numbers based at least in part on the deviation and the average.

4. The method of claim 1, wherein the determining an individual random number comprises:
   randomly attenuating the average to obtain an attenuated value; and
   determining the individual random number based on the attenuated value and a preset minimum.

5. The method of claim 1, further comprising:
   determining a residue number based on the sum and the generated random numbers;
   determining a residue value by dividing the residue number by the count; and
   adding the residue value to each of the generated random numbers to obtain a plurality of updated random numbers.

6. The method of claim 1, further comprising:
   sorting the generated random numbers; and
   storing the sorted random numbers to a list.

7. A service end system for distributing a plurality of random numbers among a plurality of accounts, comprising a processor and a non-transitory computer-readable storage medium storing instructions executable by the processor to cause the system to perform operations comprising:
   receiving, at the service end system, a request for generating random numbers from a first terminal associated with a first account, wherein the request comprises a sum of the random numbers to be generated and a count of a plurality of second accounts, to which the random numbers are to be distributed;
   determining an average based on the sum and the count;
   generating, by the service end system, a plurality of random numbers in response to the request, the generated random numbers comprising one or more random number pairs and zero or one individual random number, wherein a count of the generated random numbers equals the count of second accounts in the request, and wherein the generating comprises:
      determining two random numbers for each of the one or more random number pairs such that a sum of the two random numbers equals the average multiplied by two, and
      determining any individual random number based at least in part on the average; and
   distributing, by the service end system, the plurality of random numbers to the second accounts, wherein each of the second accounts is associated with a second terminal, and
   wherein the service end system, first terminal, and second terminals are coupled via a network.

8. The service end system of claim 7, wherein the determining two random numbers for each of the one or more random number pairs comprises determining the two random numbers based at least in part on a preset quotient between the two random numbers.

9. The service end system of claim 7, wherein the determining two random numbers for each of the one or more random number pairs comprises:
   determining a deviation range for the two random numbers of the random number pair based at least in part on the count and a preset threshold;
   determining a deviation by randomly selecting a number within the deviation range; and
   determining the two random numbers based at least in part on the deviation and the average.

10. The service end system of claim 7, wherein the determining an individual random number comprises:
    randomly attenuating the average to obtain an attenuated value; and
    determining the individual random number based on the attenuated value and a preset minimum.

11. The service end system of claim 7, wherein the operations further comprise:
    determining a residue number based on the sum and the generated random numbers;
    determining a residue value by dividing the residue number by the count; and
    adding the residue value to each of the generated random numbers to obtain a plurality of updated random numbers.

12. The service end system of claim 7, wherein the operations further comprise:
    sorting the generated random numbers; and
    storing the sorted random numbers to a list.

13. A non-transitory computer-readable storage medium associated with a service end system for distributing a plurality of random numbers among a plurality of accounts, configured with instructions executable by one or more processors to cause the one or more processors to perform operations comprising:
    receiving, at the service end system, a request for generating random numbers from a first terminal associated with a first account, wherein the request comprises a sum of the random numbers to be generated and a count of a plurality of second accounts, to which the random numbers are to be distributed;
    determining an average based on the sum and the count;
    generating, by the service end system, a plurality of random numbers in response to the request, the generated random numbers comprising one or more random number pairs and zero or one individual random number, wherein a count of the generated random numbers equals the count of second accounts in the request, and wherein the generating comprises:
       determining two random numbers for each of the one or more random number pairs such that a sum of the two random numbers equals the average multiplied by two, and
       determining any individual random number based at least in part on the average; and
    distributing, by the service end system, the plurality of random numbers to the second accounts, wherein each of the second accounts is associated with a second terminal, and
    wherein the service end system, first terminal, and second terminals are coupled via a network.

14. The non-transitory computer-readable storage medium of claim 13, wherein the determining two random numbers for each of the one or more random number pairs comprises determining the two random numbers based at least in part on a preset quotient between the two random numbers.

15. The non-transitory computer-readable storage medium of claim 13, wherein the determining two random numbers for each of the one or more random number pairs comprises:
- determining a deviation range for the two random numbers of the random number pair based at least in part on the count and a preset threshold;
- determining a deviation by randomly selecting a number within the deviation range; and
- determining the two random numbers based at least in part on the deviation and the average.

16. The non-transitory computer-readable storage medium of claim 13, wherein the determining an individual random number comprises:
- randomly attenuating the average to obtain an attenuated value; and
- determining the individual random number based on the attenuated value and a preset minimum.

17. The non-transitory computer-readable storage medium of claim 13, wherein the operations further comprise:
- determining a residue number based on the sum and the generated random numbers;
- determining a residue value by dividing the residue number by the count; and
- adding the residue value to each of the generated random numbers to obtain a plurality of updated random numbers.

18. The non-transitory computer-readable storage medium of claim 13, wherein the operations further comprise:
- sorting the generated random numbers; and
- storing the sorted random numbers to a list.

* * * * *